Feb. 15, 1966  J. E. KRYNSKI  3,235,086
FILTER

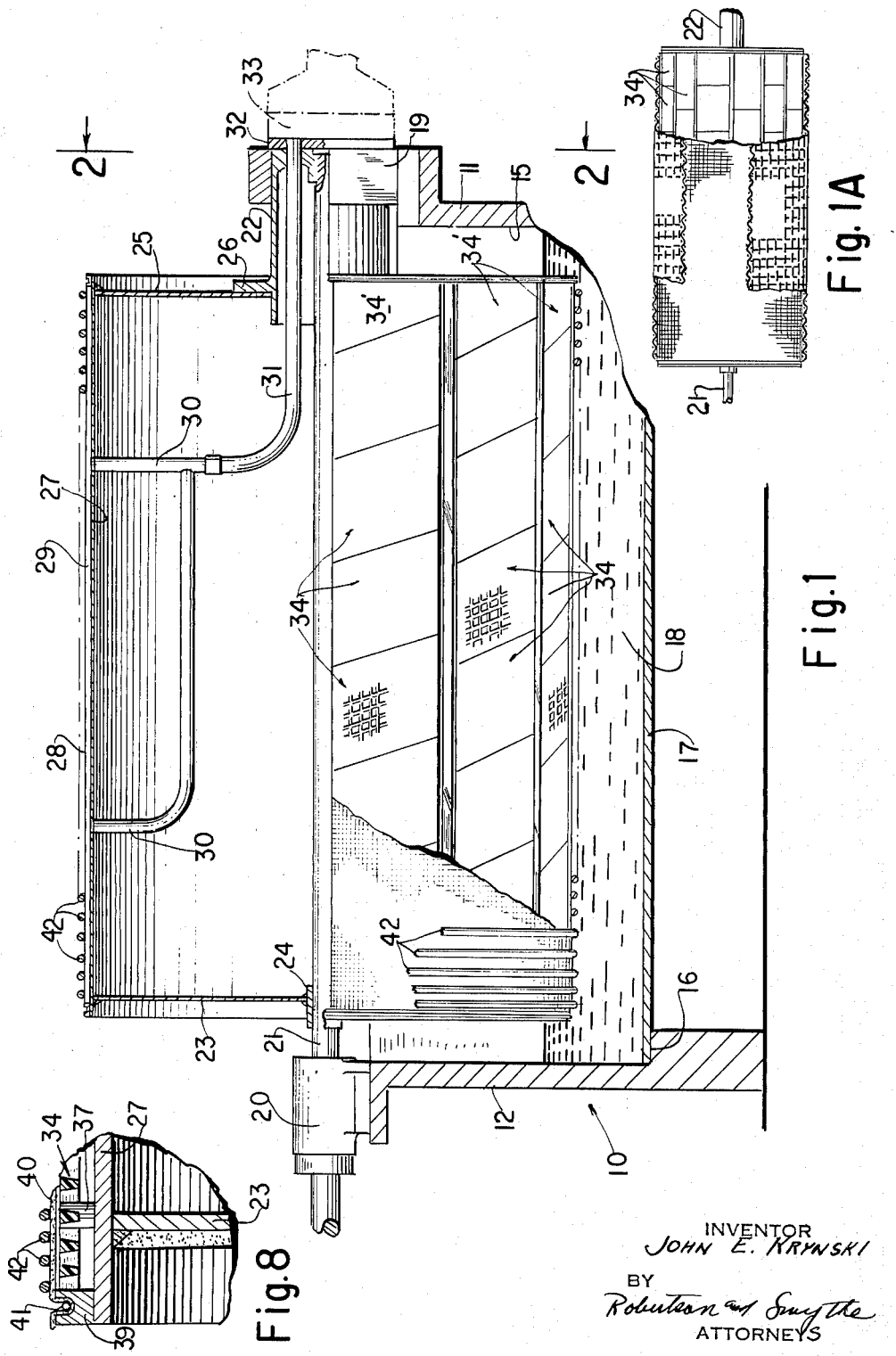

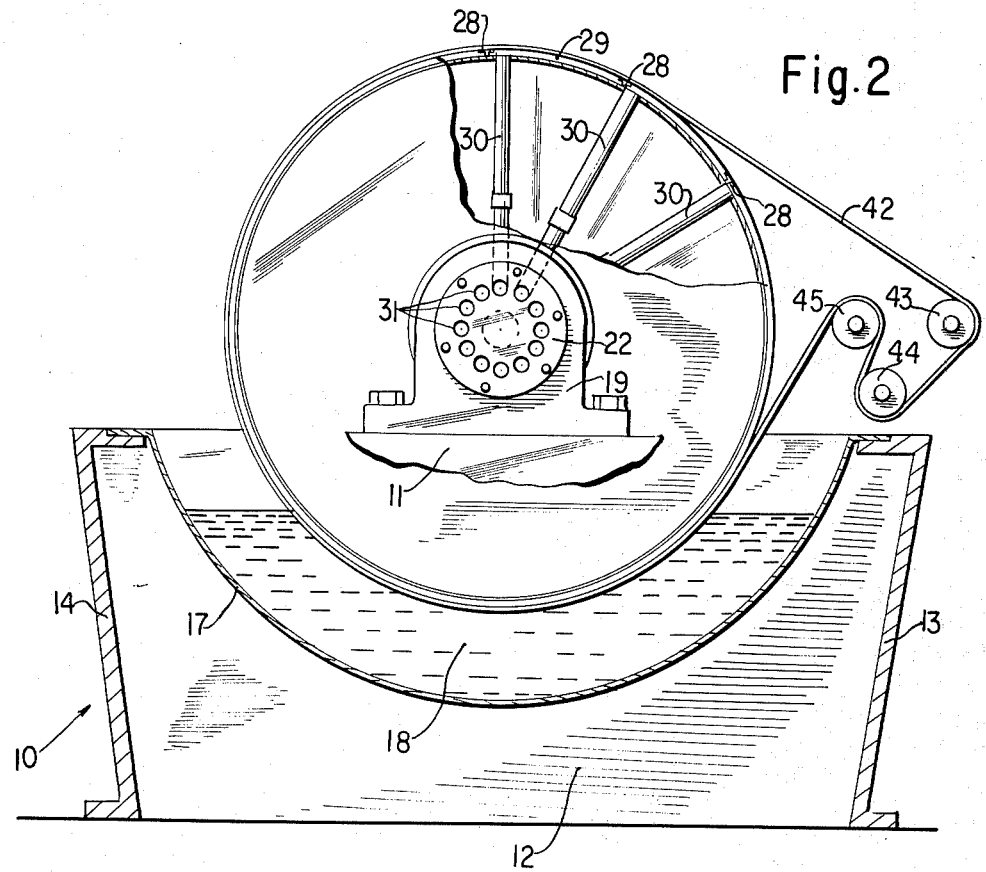
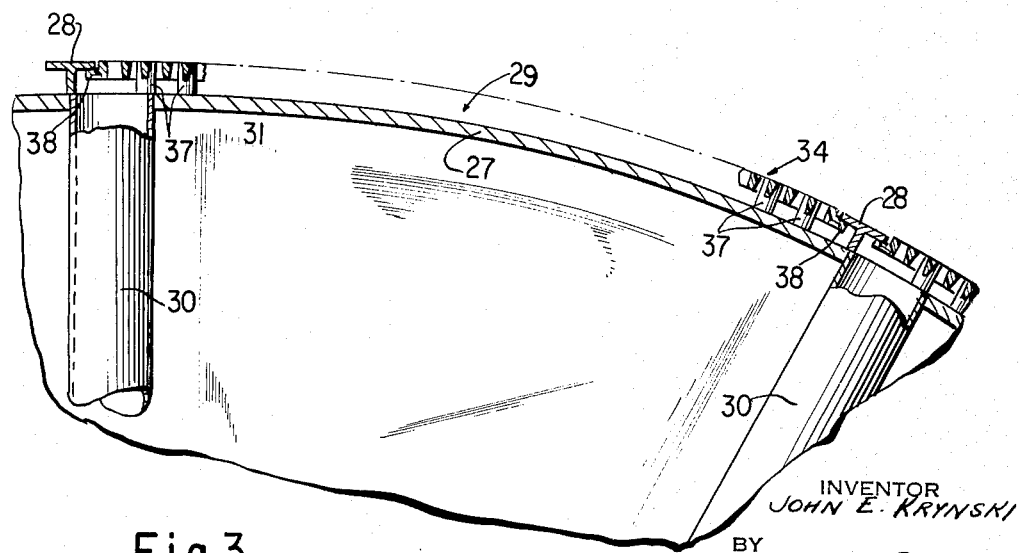

Filed Jan. 15, 1962  3 Sheets-Sheet 3

INVENTOR
JOHN E. KRYNSKI
BY
Robertson and Smythe
ATTORNEYS

United States Patent Office 3,235,086
Patented Feb. 15, 1966

3,235,086
FILTER
John E. Krynski, East Moline, Ill., assignor to Ametek, Inc., New York, N.Y., a corporation of Delaware
Filed Jan. 15, 1962, Ser. No. 166,015
2 Claims. (Cl. 210—404)

The present invention relates to drum type filters, and particularly to a new and improved drum type filter having peripherally arranged grid-like elements for supporting the filter cake collecting media.

The principal object of the invention is to provide a drum type filter having peripherally arranged grid-like elements for supporting the filter cake collecting media.

Another object of the invention is to provide such a drum type filter in which collecting compartments are formed by parallel division strips spaced about the periphery of the drum and parallel with the axis of rotation of the drums.

Still another object of the invention is to provide such a drum type filter in which the grid elements are radially spaced from the bottoms of collecting chambers of the drum type filter.

Another object of the invention is to provide such a drum type filter in which intermediate grid-like elements are mounted between the division strips having a parallelogram form with two of their parallel edges angularly disposed relative to a radial plane passing through the axis of rotation of the drum, and end grid elements of truncated rectangular form.

Still another object of the invention is to provide such a drum type filter in which the grid-like elements are made of a molded plastic.

In one aspect of the invention, a drum type filter may comprise a tank adapted to contain a slurry to be filtered. Opposite sides of the tank may support aligned bearings journaling a shaft on which a drum may be fixedly mounted. The drum may comprise spaced circular imperforate end members about the peripheries of which may be mounted an imperforate sheet rigidly attached thereto, thereby forming the drum.

In another aspect of the invention, T-shaped divider strips may be fixed to the peripheral sheet. They may extend longitudinally of the drum, be parallel to each other and equally spaced about the periphery of the drum, thereby forming separate shallow compartments or troughs about the drum periphery. Each compartment may be connected to one or more radial conduits connected to a single duct extending axially of the drum near the rotational axis thereof and terminating in a valve mechanism that may be selectively subjected to subatmospheric pressure.

In still another aspect of the invention, molded grid-like elements of generally parallelogram form may be held to the periphery of the drum by edge flanges that are received beneath the flanges of adjacent divider strips. The remaining opposed edges of the grid elements may be arranged angularly relative to a radial plane passing through the rotational axis of the drum. Such an arrangement requires the end grid elements to be truncated rectangular form in order to cooperate properly with the ends of the drum.

In still another aspect of the invention, the molded grid-like elements may include a plurality of spaced leg members extending from the inner face of the grid elements, which leg members rest in the bottom of the troughs or shallow compartments, thereby spacing the grid-like elements from the trough bottoms for facilitating adequate drainage thereto.

In still another aspect of the invention, a cloth covering may surround the drum exteriorly of the molded grid-like elements, and it may be secured to the drum periphery by having its edges held within grooves by elastic members at each end of the drum. A woven belt or strings forming a belt may surround the drum and pass over the usual cake removal rolls as is well known in the art.

The above, other objects and novel features of the invention will become apparent from th following specification and accompanying drawings which are merely exemplary.

In the drawings:

FIG. 1 is an elevational view, partly in section, of a drum filter to which the principles of the invention have been applied;

FIG. 1A is a view of a drum on a reduced scale, showing a modified form of the invention;

FIG. 2 is a sectional elevational view taken substantially along line 2—2 of FIG. 1;

FIG. 3 is an enlarged sectional elevational view of a portion of the drum shown in FIG. 2;

FIG. 8 is a sectional view of a detail of the drum shown in FIG. 1.

Figure 5:
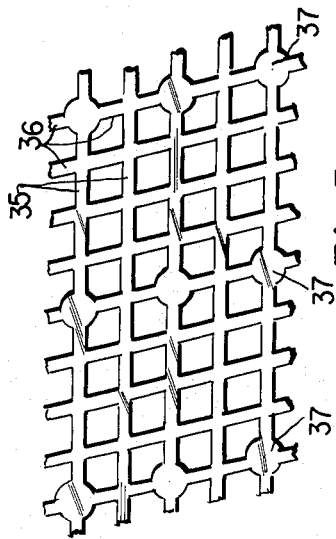
FIG. 5 is an enlarged plan view of a portion of the element shown in FIG. 4.

Referring to the drawings, and particularly to FIGS. 1 and 2, the principles of the invention are shown as applied to a drum filter including a tank 10 having four walls 11, 12, 13 and 14. The walls 11 and 12 are provided with arcuate recesses 15 and 16 that receive an arcuate trough member 17 adapted to hold a slurry 18 to be filtered.

The walls 11 and 12 may also support aligned journal bearings 19 and 20. A shaft 21 may be journaled in bearing 20, and a valve member 22, fixed to shaft 21, may be journaled in bearing 19. An imperforate circular disk 23 having a hub 24 may be fixed to shaft 21, and another imperforate circular disk 25 may be fixed to a flange 26 on the valve member 22. An imperforate sheet of metal 27 may surround and be welded or otherwise fastened to the peripheries of the disks 23 and 25 forming with said disks a drum.

Divider strips 28, which in the embodiment disclosed are shown as having a T-section, may be arranged in longitudinal parallel relation, equally spaced about and rigidly fixed to the peripheral sheet 27 of the drum. This arrangement provides a plurality of relatively shallow troughs or collecting chambers 29 about the periphery of the drum.

Each of the collecting chambers 29 may have one or more radially disposed ducts 30 leading therefrom and connected to a longitudinally disposed duct 31 that extends through the valve member 22 and terminates in a valve plate 32 that cooperates with a stationary valve member 33. The valve member 33 may be connected to a vacuum pump (not shown) in such a manner that only the ducts 31 leading to chambers 29, which latter are submerged in the slurry 18, are subjected to subatmospheric pressure.

Figure 4:
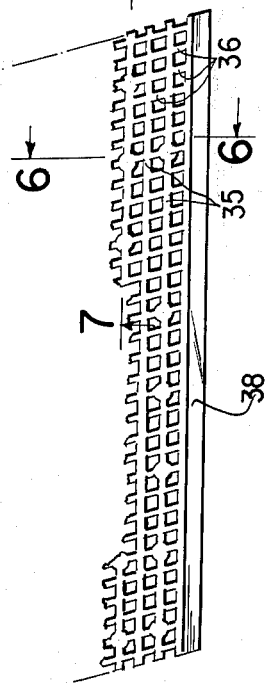
FIG. 4 is a plan view of one of the molded grid-like elements that form the periphery of the drum.

Referring to FIG. 4, grid-like elements 34 may be of generally parallelogram form, and they may be semi-rigid and molded from a plastic material such as polyethylene or the like. The elements 34 may include intersecting integral bars 35 and 36 forming a screen-like construction of relatively coarse mesh. The molded grid elements 34 may include a large number of leg members 37 extending from, and spaced over the entire area of the elements 34 for a purpose to be described later.

Figure 6:
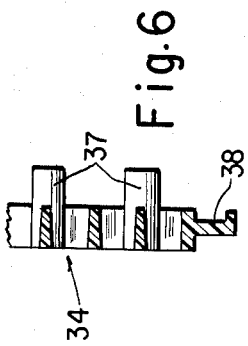
FIG. 6 is a sectional view taken substantially along line 6—6 of FIG. 4.
Figure 7:
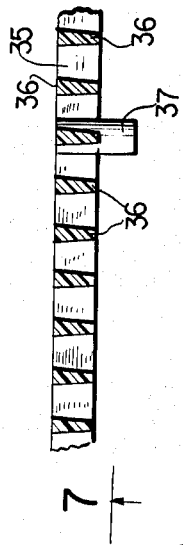
FIG. 7 is a sectional view taken substantially along line 7—7 of FIG. 4.

Referring to FIG. 6, two of the parallel edges of the members 34 may be provided with integral flange means 38. Referring to FIG. 3, elements 34 may be inserted between adjacent divider strips 28 such that their flanges 38 are located beneath the flanges of the divider strips 28, with the bottoms of the legs 37 resting on the bottom of the collecting chambers 29, thereby spacing the grid elements 34 from the bottoms of the collecting chambers 29 and facilitating adequate drainage thereto. There may be as many elements 34 between adjacent divider strips 28 as are required to completely cover the entire peripheral surface of the drum. Since the elements 34 are of the parallelogram form, the end elements 34' necessarily are of truncated rectangular form to provide end edges that lie within a plane at right angles to the longitudinal axis of the drum.

Referring to FIG. 8, the imperforate sheet 27 may extend axially beyond the disks 23 and 25, and it may support an annular grooved member 39 at each end thereof. A woven fabric cover 40 may be wrapped around the periphery of the drum, covering the plastic elements 34, and its edges may be forced into the groove of the members 39 and held therein by a resilient band 41 or the like.

A woven belt or strings 42 may be partially wrapped around the covered drum and may pass over cake removal roll 43 and idler rolls 44 and 45 as is customary in drum type filters. Accordingly, as the drum is rotated, the chambers 29 are successively caused to pass through the slurry 18 while their ducts 30, 31 are subjected to subatmospheric pressure. This causes the slurry 18 to pass through the grid-like elements 34 into the campartments 29, thence through the ducts 30, 31 and the valve member 33 to exhaust. The solids within the slurry 18 collect on the belt or strings 42 in the usual manner and are removed therefrom as the belt or strings pass over the cake removal roll 43.

The elements 34 are shown in FIG. 1 as having edges that form a line diagonally related to the axis of rotation of the drum so that when strings are employed for the belt 42, they will not pass into the joints between adjacent elements 34 and become wedged therein. In FIG. 1A, the elements 34 are shown of rectangular form which form they may take when belt 42 is a woven belt or the like.

Although the various features of the new and improved drum type filter have been shown and described in detail to fully disclose one embodiment of the invention, it is evident that changes may be made in such details and certain features may be used without others without departing from the principles of the invention.

What is claimed is:

1. A drum for a drum type filter comprising imperforate end disks; an imperforate sheet surrounding and fixed to the peripheries of said end disks; longitudinally extending, parallel, circumferentially spaced divider bars fixed to said imperforate sheet, forming shallow collecting compartments about the periphery of said drum; means for discharging the liquid from said compartments including conduit means leading from each of said compartments; flexible molded grid-like screen members mounted between adjacent divider bars about the periphery of said drum, each of said grid-like members comprising intersecting integral bars forming therebetween relatively large openings to allow relatively free drainage, flange means on said members coacting with said divider bars to secure said members on said drum, certain of said grid-like screen members being of parallelogram form, and certain others being of truncated rectangular form; and leg means integral with said grid-like screen members resting on the bottom of said shallow compartments and spacing said grid-like members from the bottom of said compartments.

2. A device according to claim 1, wherein said grid-like members are constructed of molded plastic material.

References Cited by the Examiner

UNITED STATES PATENTS

| | | | |
|---|---|---|---|
| 1,593,051 | 7/1926 | Woodworth | 210—402 |
| 2,321,230 | 6/1943 | Mills et al. | 210—404 X |
| 2,454,134 | 11/1948 | Burleson | 210—404 |
| 2,710,693 | 6/1955 | Manley et al. | 210—404 |
| 2,724,507 | 11/1955 | Cataldo | 210—404 |

FOREIGN PATENTS 1,177,370  12/1957  France.

REUBEN FRIEDMAN, *Primary Examiner.*

HERBERT L. MARTIN, *Examiner.*